(12) United States Patent
Zhang et al.

(10) Patent No.: US 9,450,715 B2
(45) Date of Patent: Sep. 20, 2016

(54) METHOD AND SYSTEM FOR MODULATION-INDEPENDENT CARRIER PHASE RECOVERY

(71) Applicant: NEC Laboratories America, Inc., Princeton, NJ (US)

(72) Inventors: Shaoliang Zhang, Princeton, NJ (US); Fatih Yaman, Monmouth Junction, NJ (US); Yoshihisa Inada, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 14/808,062

(22) Filed: Jul. 24, 2015

(65) Prior Publication Data

US 2016/0028536 A1   Jan. 28, 2016

Related U.S. Application Data

(60) Provisional application No. 62/028,870, filed on Jul. 25, 2014.

(51) Int. Cl.
*H04L 7/00* (2006.01)
*H04L 1/20* (2006.01)
*H04L 27/00* (2006.01)

(52) U.S. Cl.
CPC .............. *H04L 1/205* (2013.01); *H04L 1/206* (2013.01); *H04L 27/00* (2013.01)

(58) Field of Classification Search
CPC ............ H04B 1/00; H04B 1/10; H04B 1/69; H04B 10/06; H04B 10/54; H04B 10/61; H04B 10/524; H04B 17/00; H04J 3/14; H04J 11/00; H04J 14/00; H04J 14/02; H04L 7/00; H04L 1/205

USPC ........ 370/206, 342; 375/130, 147, 150, 316, 375/346, 371; 398/79, 202, 208, 210; 455/67.11

See application file for complete search history.

(56) References Cited

U.S. PATENT DOCUMENTS

| 9,042,741 B2* | 5/2015 | Zhou ................. H04B 10/0795 375/326 |
| 2008/0037615 A1* | 2/2008 | Chan ...................... H04L 23/02 375/150 |

(Continued)

OTHER PUBLICATIONS

L.M. Pessoa, "Performance Evaluation of Phase Estimation Algorithms in Equalized Coherent Optical Systems ", 2009.*

(Continued)

*Primary Examiner* — Sam K Ahn
*Assistant Examiner* — Shawkat M Ali
(74) *Attorney, Agent, or Firm* — Joseph Kolodka

(57) ABSTRACT

A system for carrier phase recovery, including a receiver for receiving one or more frames of L symbols. A phase estimator performs carrier phase estimation for the received frames of L symbols, and the resulting carrier phase estimates are stored in a non-transitory computer-readable storage medium. One or more rotators de-rotates the received frames of L symbols by one or more of the carrier phase estimates, and a data processor calculates a sum of the outputs of the L de-rotated signals raised to an $n^{th}$ power, and determines a real part of the sum. A minimum determination device determines a minimum of the real part of the sum with respect to the carrier phase estimates, and phase unwrapping and multiplier removal is performed if a minimum has been determined.

20 Claims, 6 Drawing Sheets

(56) References Cited

U.S. PATENT DOCUMENTS

| | | | | |
|---|---|---|---|---|
| 2009/0148164 | A1* | 6/2009 | Roberts | H04B 10/677 398/65 |
| 2010/0075611 | A1* | 3/2010 | Budampati | H04B 7/0885 455/67.11 |
| 2011/0064169 | A1* | 3/2011 | Li | H04B 10/61 375/344 |
| 2011/0217043 | A1* | 9/2011 | Pfau | H04J 14/06 398/65 |
| 2011/0318021 | A1* | 12/2011 | Zhou | H04B 10/611 398/202 |
| 2014/0050493 | A1* | 2/2014 | Sigron | H04B 10/6165 398/202 |
| 2014/0219666 | A1* | 8/2014 | Tselniker | H04L 25/03019 398/208 |
| 2014/0254723 | A1* | 9/2014 | Nazarathy | H04L 27/3872 375/326 |
| 2014/0369623 | A1* | 12/2014 | Fletcher | G06T 5/10 382/275 |
| 2015/0222368 | A1* | 8/2015 | Yu | H04B 10/5167 398/211 |

OTHER PUBLICATIONS

Gao, et al., "Modulation-Format-Independent Carrier Phase Estimation for Square M-QAM Systems", IEEE Photonics Technology Letters, pp. 1073-1076, vol. 25, No. 11, Jun. 2013.

Louchet, et al., "Joint Carrier-Phase and Polarization Rotation Recovery for Arbitrary Signal Constellations", IEEE Photonics Technology Letters, pp. 922-924, vol. 26, No. 9, May 2014.

Pfau, "Hardware-Efficient Coherent Digital Receiver Concept With Feedforward Carrier Recovery for M-QAM Constellations", Journal of Lightwave Technology, pp. 989-999, vol. 27, No. 8, Apr. 15, 2009.

* cited by examiner

METHOD AND SYSTEM FOR MODULATION-INDEPENDENT CARRIER PHASE RECOVERY

RELATED APPLICATION INFORMATION

This application claims priority to provisional application No. 62/028,870 filed Jul. 25, 2014, the contents of which are incorporated herein by reference.

BACKGROUND OF THE INVENTION

1. Technical Field

The present invention relates generally to carrier phase recovery, and more particularly, to modulation-independent feed-forward carrier phase recovery with a multiplier free structure.

2. Description of the Related Art

Carrier phase recovery is an important problem in optical coherent detection schemes, because of the phase noise incurred from laser linewidth. As use of multimedia communications services over packet data networks (e.g., the Internet) continues to grow, the demand for higher capacity in core data transport networks also continues to grow. Core data networks may include optical networks based on fiber optic technology. To increase the capacity of optical networks, advanced signal modulation techniques, such as quadrature phase shift key (QPSK) and quadrature amplitude modulation (QAM) have been developed. In particular, M-ary QAM (M-QAM) (e.g., 16-QAM and 64-QAM) have the potential to realize high-speed optical transmission with high spectral efficiency.

Digital coherent detection has been employed for detecting and demodulating received optical signals, and a key step in digital coherent detection is carrier phase recovery. Carrier phase may be degraded by laser phase noise in a received optical signal, and laser phase noise is dependent on the linewidth of the optical carrier. For example, for high-order M-QAM modulation formats (e.g., M>4), the tolerance for laser phase noise becomes smaller as the modulation increases. As modulation formats become higher and higher, there is a need for a carrier phase recovery system and method to be universal to any modulation format (e.g., modulation independent characteristics).

Various carrier phase recovery systems and methods have been developed, but there are very few systems and methods available that are capable of performing modulation-independent carrier phase recovery. For example, one existing modulation-independent carrier phase recovery system employs a feedback structure with a cost function to remove the dependence on modulation formats. However, the cost function is not sensitive to phase errors, and requires feedback to adjust the phase estimation, which is not practical for use in a parallel architecture. Moreover, none of the existing systems and methods are capable of performing multiplier-free carrier phase recovery.

BRIEF SUMMARY OF THE INVENTION

A method for carrier phase recovery, including receiving one or more frames of L symbols using a receiver, performing carrier phase estimation for the one or more frames of L symbols using a phase estimator, and storing resulting carrier phase estimates in a non-transitory computer-readable storage medium. The one or more frames of L symbols are de-rotated by one or more of the carrier phase estimates, a sum of the outputs of the L de-rotated signals is calculated and raised to an $n^{th}$ power, and a real part of the sum is determined. A minimum of the real part of the sum with respect to the carrier phase estimates is determined, and phase unwrapping and multiplier removal is performed if a minimum has been determined A system for carrier phase recovery, including a receiver for receiving one or more frames of L symbols, and a phase estimator for performing carrier phase estimation for the one or more frames of L symbols, the resulting carrier phase estimates being stored in a non-transitory computer-readable storage medium. One or more rotators de-rotate the one or more frames of L symbols by one or more of the carrier phase estimates. A data processor calculates a sum of the outputs of the L de-rotated signals raised to an $n^{th}$ power, and determines a real part of the sum. A minimum determination device determines a minimum of the real part of the sum with respect to the carrier phase estimates, and phase unwrapping and multiplier removal is performed if a minimum has been determined A computer readable storage medium comprising a computer readable program, wherein the computer readable program when executed on a computer causes the computer to perform the steps of receiving one or more frames of L symbols using a receiver, performing carrier phase estimation for the one or more frames of L symbols using a phase estimator, and storing resulting carrier phase estimates in a non-transitory computer-readable storage medium. The one or more frames of L symbols are de-rotated by one or more of the carrier phase estimates, a sum of the outputs of the L de-rotated signals is calculated and raised to an $n^{th}$ power, and a real part of the sum is determined. A minimum of the real part of the sum with respect to the carrier phase estimates is determined, and phase unwrapping and multiplier removal is performed if a minimum has been determined.

These and other advantages of the invention will be apparent to those of ordinary skill in the art by reference to the following detailed description and the accompanying drawings.

DETAILED DESCRIPTION

Figure 1:
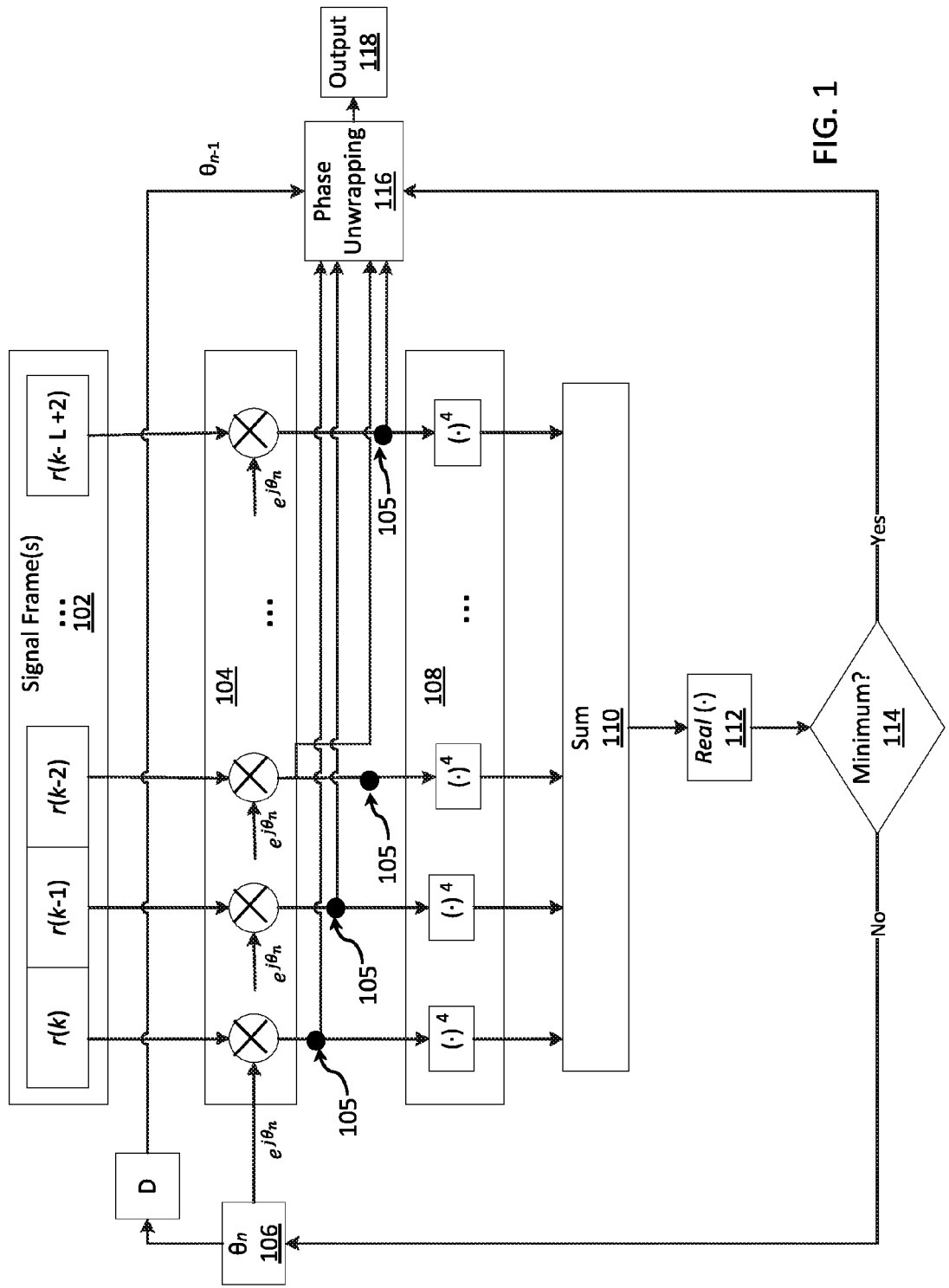
FIG. 1 shows a block/flow diagram illustratively depicting an exemplary system/method for carrier phase recovery, in accordance with an embodiment of the present principles.

The present invention is directed to optimizing performance of communication systems by employing carrier phase estimation and recovery in accordance with the present principles. In one embodiment, the present principles provide a feed-forward, modulation-independent computer implemented method for carrier phase recovery. In accordance with particularly useful embodiments the present principles may provide a multiplier-free carrier phase recovery method to reduce complexity, thereby improving hardware efficiency and optimizing system performance. In some embodiments, the feed-forward structure enables parallel implementation of high-speed coherent receivers without performance degradation.

The carrier phase of a carrier wave modulated with, for example, information symbols may be recovered by carrier phase recovery according to an embodiment of the present principles. A new cost function which estimates a carrier phase with an ultra-high sensitivity method as compared with conventional carrier phase estimation techniques may be employed. The new cost function may be employed in a feed-forward blind-phase searching method to recover original signals without specifying modulation formats (e.g., modulation-independent). Feed-forward systems and methods may modify or control a process using anticipated results or effects rather than requiring the use of previous results or effects, as required by feedback systems and methods.

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an exemplary system/method 100 for carrier phase recovery is illustratively depicted in accordance with an embodiment of the present principles. Carrier recovery systems may be a circuit which may be employed to estimate and compensate for frequency and phase differences between a received signal's carrier wave and the receiver's local oscillator. A constellation may be rotated by one or more effects (e.g., laser linewidth) through which a signal passes.

In an illustrative embodiment, to estimate the carrier phase of received signals that are phase rotated (e.g., by laser linewidth), a carrier phase may be estimated in a frame of, for example, L symbols 102. The symbols in the frame of L symbols 102 may include, for example, r(k), r(k−1), etc., with r representing a receiver for a signal, and k representing the kth signal. Phase noise may change slowly over consecutive several symbols, and the frame length L (e.g., a frame of length L may include L symbols) may depend on the magnitude of the laser linewidth in the system. In an embodiment, a one symbol delay may be included in block 103 to unwrap the phase noise. The signal frame including L symbols 102 (e.g., received signals that have been phase rotated by the laser linewidth) may be rotated (e.g., de-rotated) in block 104 using one or more rotators by a current estimate for phase noise ($\theta_n$) stored in, for example, a lookup table (LUT) for phase estimation. The phase rotation applied to each signal in block 104 may include $e^{j\theta_n}$, where e is an exponent, $\theta_n$ is a current estimate for phase noise, and j is an imaginary constellation point.

In an embodiment, the phase estimate $\theta_n$ may include angles which range from, for example, $-\pi/4$ to $+\pi/4$. The signals may pass through signal splitters in block 105, and the de-rotated signals may be raised to, for example, the fourth (4th) power in block 108 to mitigate the impact of phase modulation from the signals. The outputs of block 108 may then be summed up in block 110, and the real part of that sum (e.g., real part of a symbol) may be determined in block 112. It is noted that the above-mentioned angle range ($-\pi/4$ to $+\pi/4$), and the power to which the signals are raised (4th) are presented as such for simplicity of illustration, but any angles or powers may be employed according to various embodiments of the present principles.

In an embodiment, a minimum of the output of block 112 may be determined in block 107 with respect to the phase estimate $\theta_n$. The minimum is determined because all signal points may include a maximum projection to the x-axis or y-axis when there is not any phase rotation. However, the presence of, for example, either 45 or 90 degree rotation of the constellation points (e.g., $n\pi/2 + \pi/4$, or $n\pi/2$, respectively) may determine the sign of the projection (e.g., plus or minus). For example, in the case of Binary Phase Shift Keying (BPSK), with, for example, two constellation points $(0, \pi)$, employing a projection of the $4^{th}$ power in block 108 may become the maximum. If the BPSK is rotated by 45 degrees (e.g., $(\pi/4, 5\pi/4)$), then the projection would be the minimum after applying the $4^{th}$ power operation in block 108. However, the continual rotation of the constellation by 45 degrees may cause increased phase ambiguity (e.g., phase noise), so the minimum may be employed to determine the phase estimate in block 114.

In an embodiment, the carrier phase may be estimated using the following method:

$$\underset{\theta \in (-\pi/4, \pi/4)}{\operatorname{argmin}} \operatorname{real}\left\{\sum_{l=0}^{L-1}(r(k+l) \cdot \exp(-j\theta_n))^4\right\}, \quad (1)$$

where $-\pi/4$, $+\pi/4$ represents a range of angles, L represents a number of symbols, l represents an index, $r(k+l)$ represents a symbol in the set of symbols represented by L, and the phase is represented by $\exp(-j\theta_n)$. Because of the use of the $4^{th}$ power operation in this example, the phase estimate may be limited to $-\pi/4$ to $+\pi/4$, which may cause cycle slips if non-differential decoding were employed. Therefore, phase unwrapping may be applied in block 116 to unwrap the current phase estimate based on the previous phase estimate to prevent cycle slips according to the present principles.

In an embodiment, the phase unwrapping may be performed according to the following method:

$$\theta_n \begin{cases} \theta_n - \frac{\pi}{2} & \text{while } \theta_n - \theta_{n-1} > \frac{\pi}{4} \\ \theta_n + \frac{\pi}{2} & \text{while } \theta_n - \theta_{n-1} < -\frac{\pi}{4}, \\ \theta_n & \text{otherwise} \end{cases} \quad (2)$$

where $\theta_n$ represents a current phase estimate, and $\theta_{n-1}$ represents a previous phase estimate. As shown above, during phase unwrapping, the phase estimate $\theta_n$ may be adjusted by 0, or $\pm\pi/2$, depending on the previous phase estimate $\theta_{n-1}$. Accordingly, the output of block 104 may be multiplied by 1, or $\pm j$ in block 116, and results may be output in block 118 in an embodiment of the present principles. In an embodiment, the output of block 118 may be applied during a next phase of digital coherent detection to improve transmission speed and/or to remove phase noise present in a communication medium. Furthermore, the output of block 118 may also be employed to remove dependence on a particular modulation format, as discussed in further detail hereinbelow.

In some embodiments, phase unwrapping may also be performed in block 116 to the minimum determined in block 114. For example, phase unwrapping may be performed in block 116 by adding multiples of $\pi/2$, corresponding to 1 or $\pm j$ (e.g., because of the $\exp(j\theta_n)$ operation described above in equation (1)). In an illustrative embodiment, the output signal of block 104 may be split by a signal splitter 105, and the phase unwrapping may be performed by a phase unwrapper in block 116.

Although the above method may be employed with any type of modulation format without prior knowledge, there may be many multipliers present inside the carrier phase estimator according to the present principles. Therefore, in some embodiments, the method may be simplified, and employed without multipliers (e.g., to reduce hardware complexity and improve processing speed) as follows:

$$\underset{\theta_n \in (-\pi/4, \pi/4)}{\operatorname{argmin}} \operatorname{real}\left\{\sum_{l=0}^{L-1} (r(k+l) \cdot \exp(-j\theta_n))^4\right\} = \quad (3)$$

$$\underset{\theta_n \in (-\pi/4, \pi/4)}{\operatorname{argmin}} \sum_{l=0}^{L-1} \operatorname{real}\{r^4(k+1) \cdot \exp(-j4\theta_n)\} =$$

$$\underset{\theta_n \in (-\pi/4, \pi/4)}{\operatorname{argmin}} \sum_{l=0}^{L-1} |r(k+l)|^4 \cdot \cos(4 \cdot (\operatorname{angle}(r(k+1)) - \theta_n))$$

Figure 2:
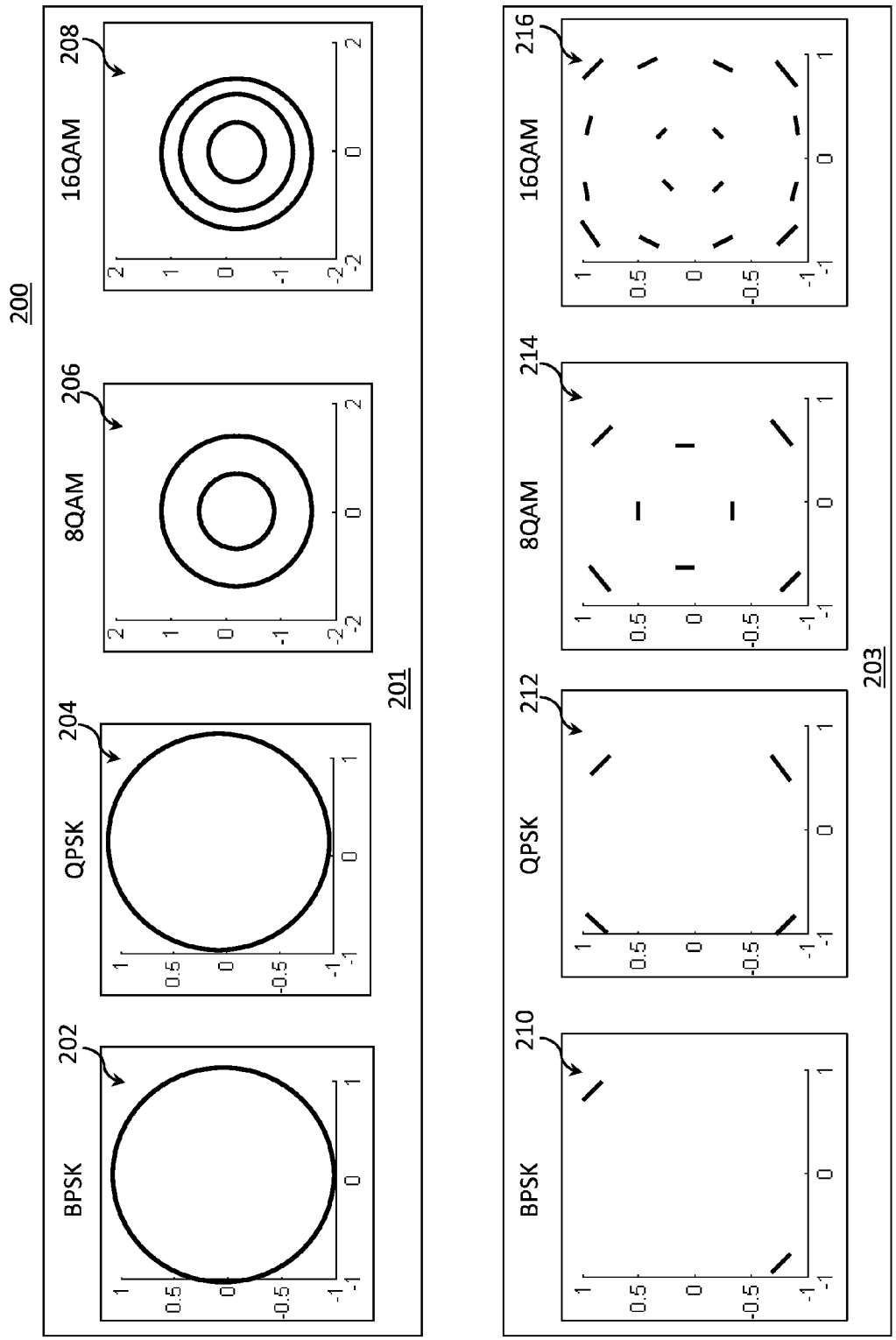
FIG. 2 shows a diagram illustratively depicting exemplary original and recovered constellations for carrier phase recovery, in accordance with an embodiment of the present principles.

Referring now to FIG. 2, a diagram 200 showing exemplary original 201 and recovered constellations 203 for carrier phase recovery is illustratively depicted in accordance with an embodiment of the present principles. For illustrative purposes, original constellations 201 (e.g., including carrier phase noise) are shown with respect to various constellation types, including BPSK 202, Quadrature Phase Shift Keying (QPSK) 204, 8 Quadrature Amplitude Modulation (8QAM) 206, and 16 Quadrature Amplitude Modulation (16QAM) 208.

In an embodiment, recovered constellations 203 which have been recovered according to the present principles are illustratively depicted, and correspond to the original constellations 201. The recovered constellations 203 include BPSK 210, QPSK 212, 8QAM 214, and 16QAM. It is noted that although the above constellation types are shown, it is contemplated that any constellation types may be employed according to the present principles. As shown in the recovered constellations 203, carrier phase noise has been successfully removed. More symbols may be employed for estimating the carrier phase for higher-order QAM (e.g., 8QAM, 16QAM, etc.) because of the averaging effects of the method according to the present principles.

Figure 3:
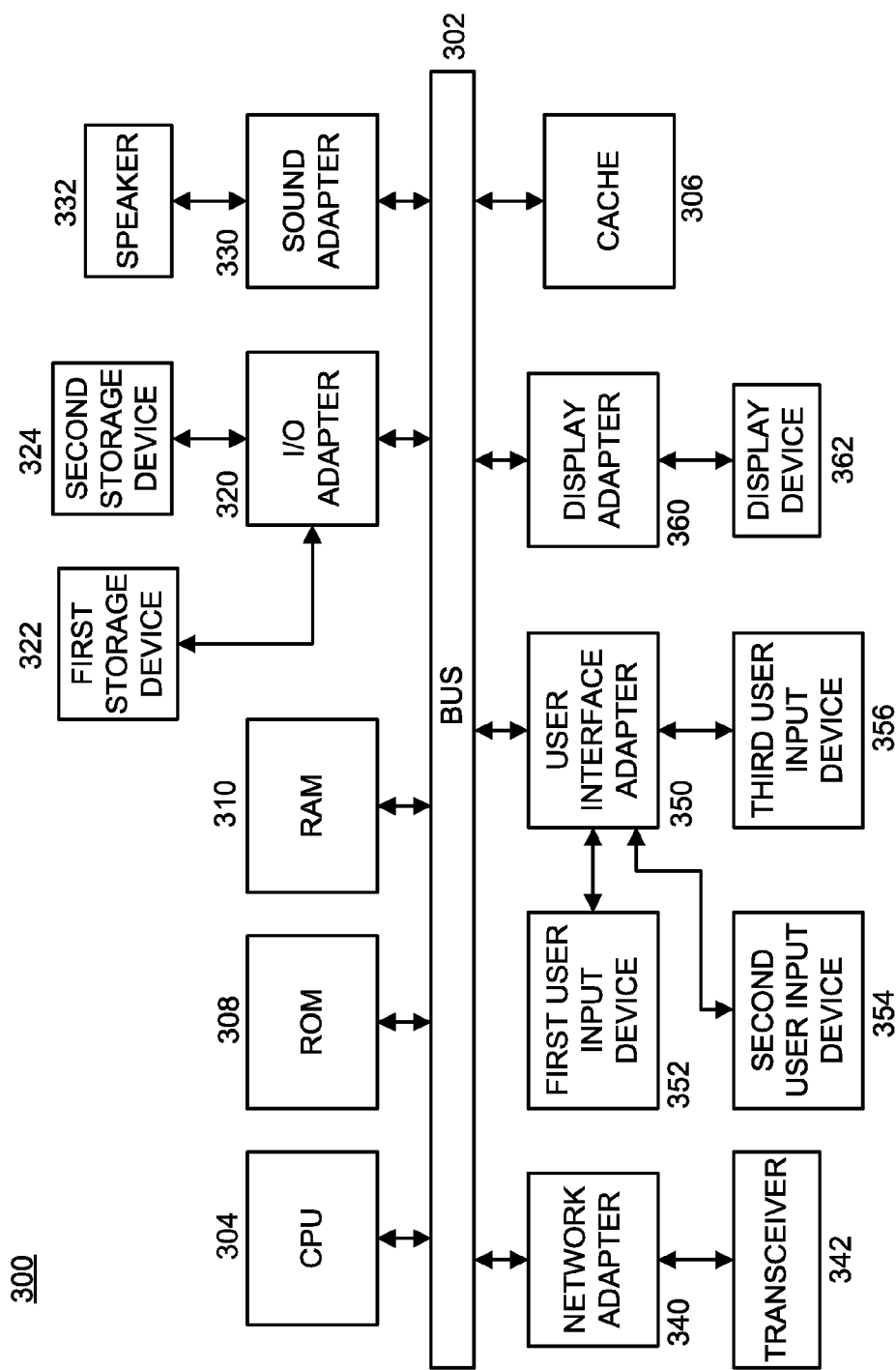
FIG. 3 shows an exemplary processing system to which the present principles may be applied, in accordance with an embodiment of the present principles.

Referring now to FIG. 3, an exemplary processing system 300 to which the present principles may be applied, is illustratively depicted in accordance with an embodiment of the present principles. The processing system 300 includes at least one processor (CPU) 304 operatively coupled to other components via a system bus 302. A cache 306, a Read Only Memory (ROM) 308, a Random Access Memory (RAM) 310, an input/output (I/O) adapter 320, a sound adapter 330, a network adapter 340, a user interface adapter 350, and a display adapter 360, are operatively coupled to the system bus 302.

A first storage device 322 and a second storage device 324 are operatively coupled to system bus 302 by the I/O adapter 320. The storage devices 322 and 324 can be any of a disk storage device (e.g., a magnetic or optical disk storage device), a solid state magnetic device, and so forth. The storage devices 322 and 324 can be the same type of storage device or different types of storage devices.

A speaker 332 is operatively coupled to system bus 302 by the sound adapter 330. A transceiver 342 is operatively coupled to system bus 302 by network adapter 340. A display device 362 is operatively coupled to system bus 302 by display adapter 360.

A first user input device 352, a second user input device 354, and a third user input device 356 are operatively coupled to system bus 302 by user interface adapter 350. The user input devices 352, 354, and 356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 352, 354, and 356 can be the same type of user input device or different types of user input devices. The user input devices 352, 354, and 356 are used to input and output information to and from system 300.

Of course, the processing system 300 may also include other elements (not shown), as readily contemplated by one of skill in the art, as well as omit certain elements. For example, various other input devices and/or output devices can be included in processing system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 300 are readily contemplated by one of ordinary skill in the art given the teachings of the present principles provided herein.

Figure 4:
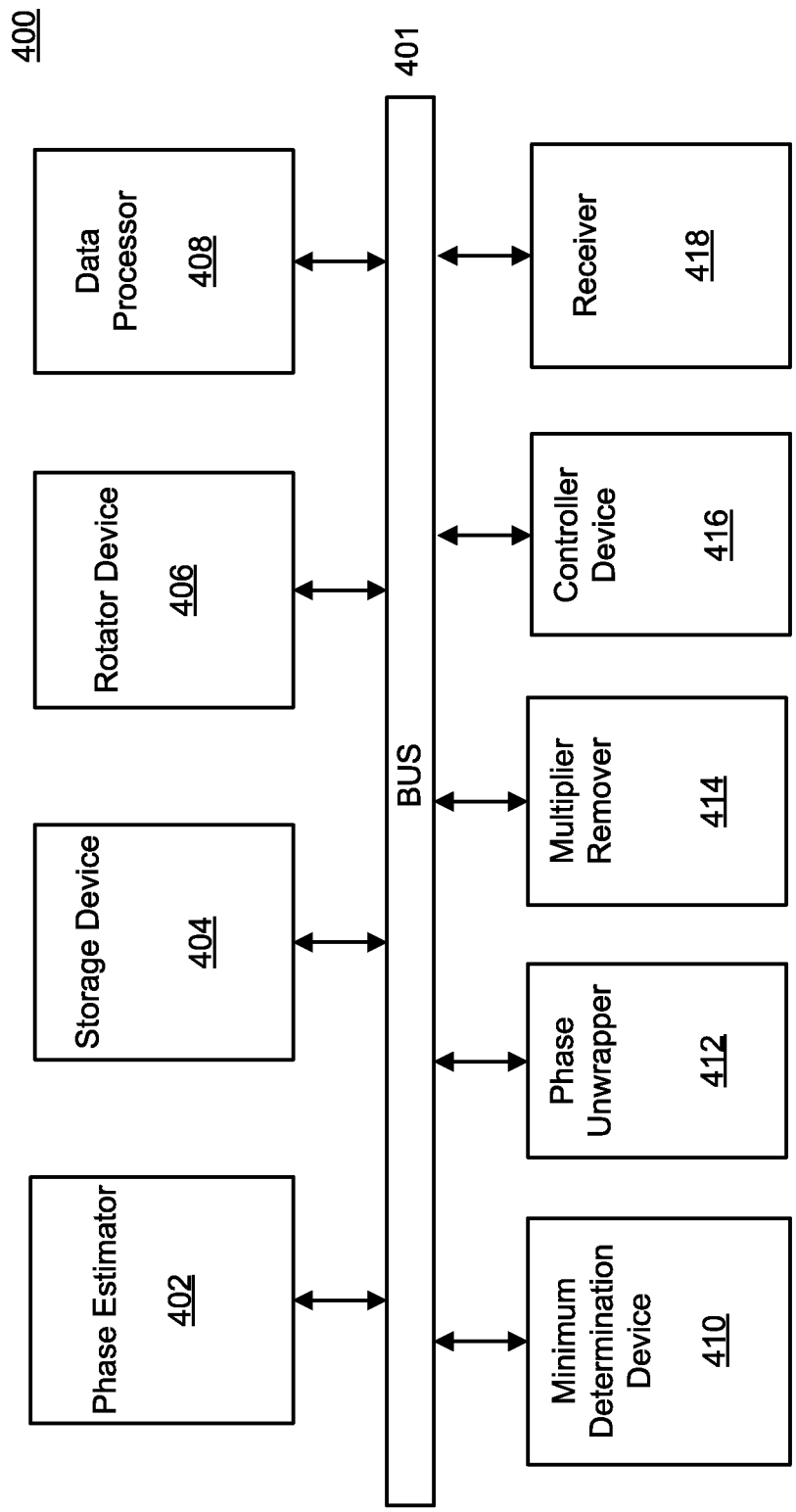
FIG. 4 shows an exemplary system for carrier phase recovery, in accordance with an embodiment of the present principles.

Moreover, it is to be appreciated that system 400 described below with respect to FIG. 4 is a system for implementing respective embodiments of the present principles. Part or all of processing system 300 may be implemented in one or more of the elements of system 400.

Figure 6:
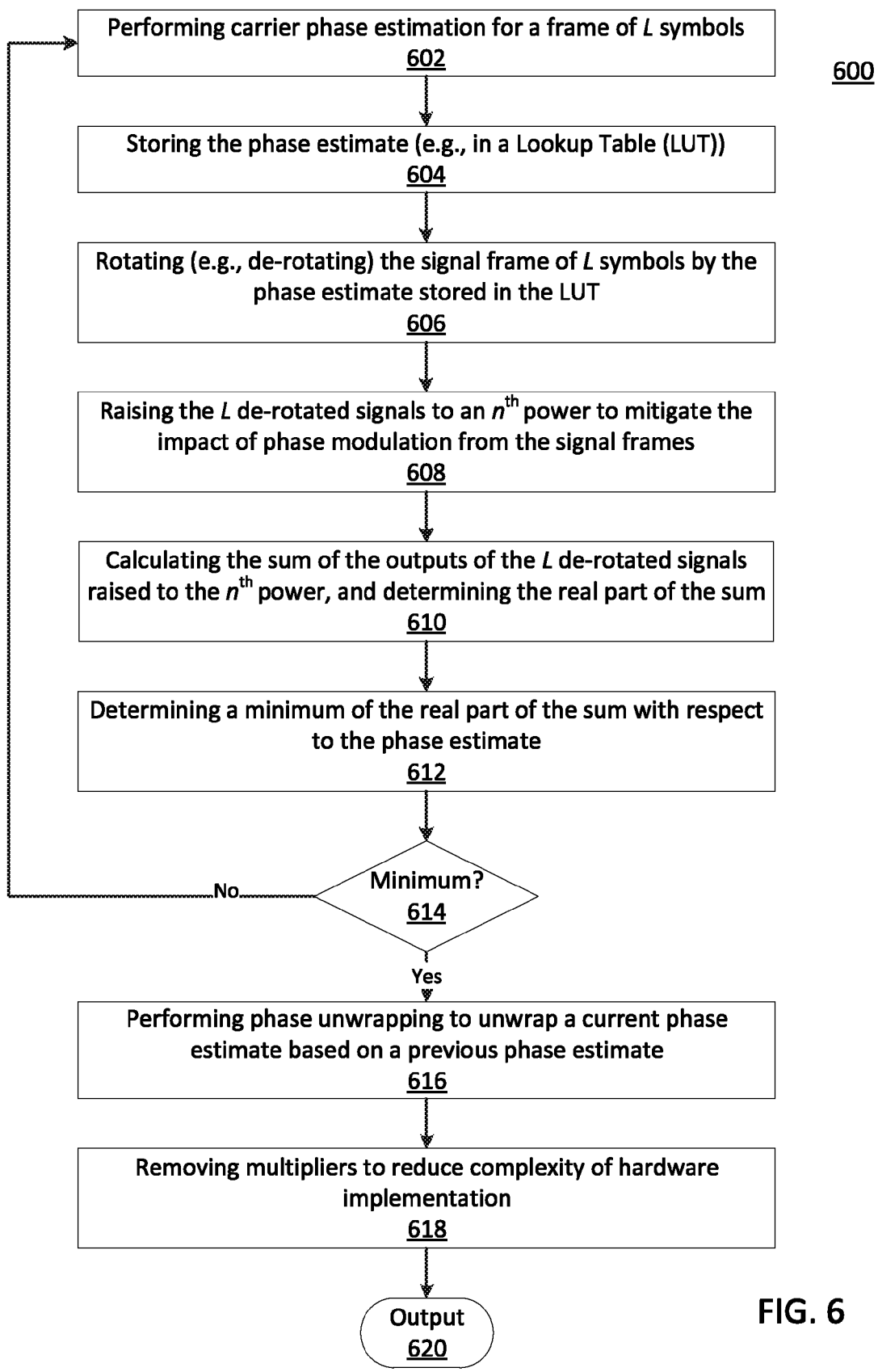
FIG. 6 shows an exemplary method for carrier phase recovery, in accordance with an embodiment of the present principles.

Further, it is to be appreciated that processing system 300 may perform at least part of the method described herein including, for example, at least part of method 600 of FIG. 6. Similarly, part or all of system 400 may be used to perform at least part of method 600 of FIG. 6.

Referring now to FIG. 4, with continued reference to FIG. 1, an exemplary system 400 for carrier phase recovery is illustratively depicted in accordance with an embodiment of the present principles. In one embodiment, data (e.g., a data transmission) may be received by a receiver 418 and a phase estimator 402 may be employed to estimate the carrier phase of received symbols 102 that have been phase rotated by, for example, phase noise caused by laser linewidth. A storage device 404 may be employed to store data in, for example, a LUT 106, and a rotator device 406 may rotate (e.g., de-rotate) by the phase stored in the LUT 106. A data processor 408 may raise de-rotated symbols to an $n^{th}$ power to mitigate the impact of phase modulation from the signals, sum up the outputs (e.g., de-rotated symbols) of the rotator device 406, and take the real part of the sum (e.g., real signals) according to the present principles. In various embodiments, all or some of the above-mentioned devices may be attached to a system bus 401.

In an embodiment, a minimum determination device 410 may determine the minimum of the outputs of the data processor 408 (e.g., minimum of the real number in block 112) with respect to a current carrier phase estimate θn. If a minimum is not reached, a controller device 116 may iterate the phase estimator 402, rotator device 406, data processor 408, and minimum determination device 410 according to the present principles. A multiplier remover 414 may be employed to remove multipliers present in the system 400 to reduce hardware complexity and increase processing speed. A phase unwrapper 412 may unwrap a current phase estimate based on a previous phase estimate according to the present principles. The controller device 416 may control any aspect of the system and method according to the present principles, including data transmitting and receiving, and may be a global or local controller in various embodiments.

Figure 5:
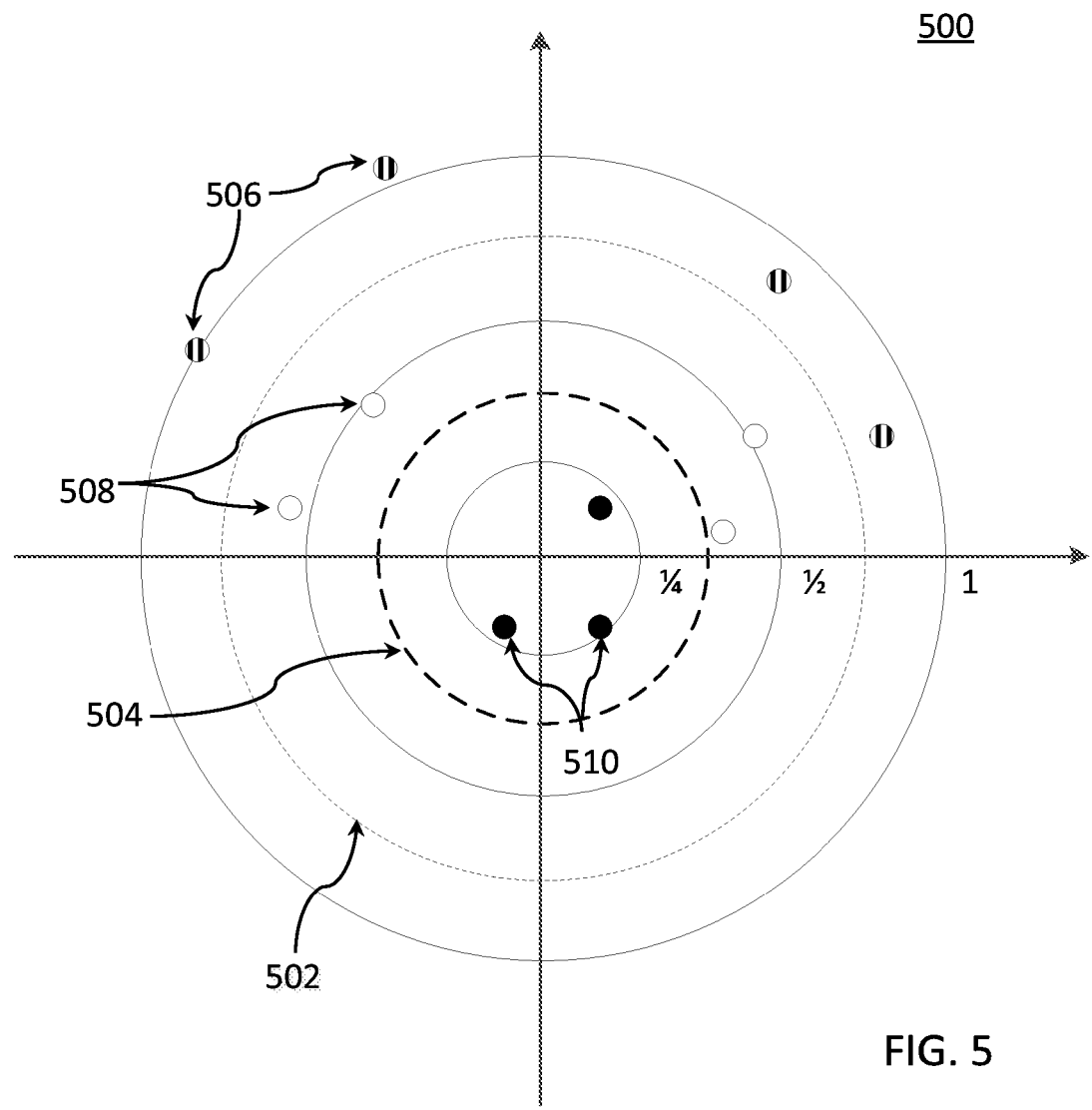
FIG. 5 shows a diagram illustratively depicting a decision boundary for removing multipliers during carrier phase recovery, in accordance with an embodiment of the present principles.

Referring now to FIG. 5, a diagram illustratively depicting a decision boundary 500 for removing multipliers during carrier phase recovery is illustratively depicted in accordance with an embodiment of the present principles. In one embodiment, to avoid (e.g., remove) multipliers, the received signals may be divided into a plurality of rings which may act as decision boundaries 502, 504 for received signal points.

In an illustrative embodiment, the received signals (e.g., $|r(k)|^4$) of the received points 506 are closer to the decision ring of 1 than to other rings, and as such, the $4^{th}$ power may be replaced by 1 to remove multipliers according to the approximation employed by the decision boundary 500. The same rule may apply to points 508, in which the power of $|r(k)|^4$ may be replaced by 1/16 (e.g., based on the closest decision ring), and to points 510, in which the power of $|r(k)|^4$ may be replaced by 1/256 (e.g., based on the closest decision ring). For example, if r(k)=1/2, r(k) may be raised to the fourth power (e.g., $(1/2)^4$), with the result being 1/16; and if r(k)=1/4, r(k) may be raised to the fourth power (e.g., $(1/4)^4$), with the result being 1/256. In an embodiment, an advantage of using these numbers is that they are a power of two, and therefore the multiplication of $2^n x$ is only right-shifting the value x by n bits in a register. The 4 times amplification may also be performed by left shifting the angle (e.g., (angle (r(k+1))−θ$_n$)) by 2 bits in some embodiments.

In an embodiment, the method for removing multipliers using the decision boundary 500 may be expressed as follows:

$$\underset{\theta_n \in (-\pi/4, \pi/4)}{\mathrm{argmin}} \sum_{l=0}^{L-1} |r(k+l)|^4 \cdot \cos(4 \cdot (\mathrm{angle}(r(k+1)) - \theta_n)) = \quad (4)$$

$$\underset{\theta_n \in (-\pi/4, \pi/4)}{\mathrm{argmin}} \sum_{l=0}^{L-1} \cos((\mathrm{angle}(r(k+1)) - \theta_n) \ll 2 \text{ bits}) \gg$$

$$\{0, 4, 8 \text{ bits}\}_{r(k+l)},$$

where ≪ represents left-shifting and ≫ represents right shifting. The amount of right-shifting may depend on which boundary the received signal lies within. For example, right-shifting may be determined as follows:

Right-shifting $n bits =$ $$\begin{cases} 8, & \text{if } r(k) \text{ is inside decision boundary 502} \\ 4, & \text{if } r(k) \text{ is between decision boundaries 502 and 504} \\ 0, & \text{if } r(k) \text{ is outside decision boundary 504} \end{cases}$$

This simplification (e.g., removal of multipliers) does not result in a significant impact on carrier phase recovery performance according to the present principles, but advantageously reduces hardware complexity and improves processing speed of the system according to various embodiments.

Referring now to FIG. 6, an exemplary method for carrier phase recovery is illustratively depicted in accordance with an embodiment of the present principles. In block 602, a carrier phase estimate may be determined for a frame of L symbols by a phase estimator in accordance with an embodiment. In block 604, the determined phase estimate may be stored in a storage device (e.g., LUT), and the signal frame of L symbols may be rotated (e.g., de-rotated) by the phase estimate stored in the LUT in block 606. The phase rotation applied to each signal in block 104 may include $e^{j\theta n}$, where, and e is an exponent, θ$_n$ is a current estimate for phase noise, and j is an imaginary constellation point.

In an embodiment, the phase estimate θ$_n$ may include angles which range from, for example, −π/4 to +π/4. The signals may pass through signal splitters, and the de-rotated signals may be raised to, for example, the fourth (4th) power in block 608 to mitigate the impact of phase modulation from the signals. The outputs of block 608 may then be summed up in block 610, and the real part of that sum (e.g., real part of a symbol) may also be determined in block 610 using a data processor. It is noted that the above-mentioned angle range (−π/4 to +π/4), and the power to which the signals are raised (4th) is presented as such for simplicity of illustration, but any angles or powers may be employed according to various embodiments of the present principles.

In an embodiment, a minimum of the output of block 612 may be determined in block 614 with respect to the phase estimate $\theta_n$. The minimum is determined because all signal points may include a maximum projection to the x-axis or y-axis when there is not any phase rotation. However, the presence of, for example, either 45 or 90 degree rotation of the constellation points (e.g., $n\pi/2+\pi/4$, or $n\pi/2$, respectively) may determine the sign of the projection (e.g. plus or minus). For example, in the case of Binary Phase Shift Keying (BPSK), with, for example, two constellation points $(0, \pi)$, employing a projection of the $4^{th}$ power in block 108 may become the maximum, and if the BPSK is rotated by 45 degrees (e.g., $(\pi/4, 5\pi/4)$, then the projection would be the minimum after applying the $4^{th}$ power operation in block 108. However, the continual rotation of the constellation by 45 degrees may cause increased phase ambiguity (e.g., phase noise), so the minimum may be employed to determine the current phase estimate.

In an embodiment, the carrier phase may be estimated using the following method:

$$\operatorname*{argmin}_{\theta \in (-\pi/4, \pi/4)} \operatorname{real}\left\{\sum_{l=0}^{L-1} (r(k+l) \cdot \exp(-j\theta_n))^4\right\}, \quad (1)$$

where $-\pi/4, +\pi/4$ represents a range of angles, L represents a number of symbols, l represents an index, $r(k+l)$ represents a symbol in the set of symbols represented by L, and the phase is represented by $\exp(-j\theta_n)$. Because of the use of the $4^{th}$ power operation in this example, the phase estimate may be limited to $-\pi/4$ to $+\pi/4$, which may cause cycle slips if non-differential decoding were employed. Therefore, phase unwrapping may be applied in block 616 to unwrap the current phase estimate based on the previous phase estimate to prevent cycle slips according to the present principles.

In an embodiment, the phase unwrapping in block 616 may be performed according to the following method:

$$\theta_n \begin{cases} \theta_n - \dfrac{\pi}{2} & \text{while } \theta_n - \theta_{n-1} > \dfrac{\pi}{4} \\ \theta_n + \dfrac{\pi}{2} & \text{while } \theta_n - \theta_{n-1} < -\dfrac{\pi}{4}, \\ \theta_n & \text{otherwise} \end{cases} \quad (2)$$

where $\theta_n$ represents a current phase estimate, and $\theta_{n-1}$ represents a previous phase estimate. As shown above, during phase unwrapping, the phase estimate $\theta_n$ may be adjusted by 0, or $\pm\pi/2$, depending on the previous phase estimate $\theta_{n-1}$. Accordingly, the output of block 606 may be multiplied by 1, or $\pm j$ in block 618, and results may be output in block 620 in an embodiment of the present principles. In some embodiments, phase unwrapping may also be performed in block 616 to the minimum determined in block 614.

Although the above method may be employed with any type of modulation format without prior knowledge (e.g., feed-forward design), there may be many multipliers present inside the carrier phase estimator according to the present principles. Therefore, in some embodiments, the method may be simplified, and multipliers may be removed in block 618 (e.g., to reduce hardware implementation complexity and improve processing speed) according to the present principles as follows:

$$\operatorname*{argmin}_{\theta_n \in (-\pi/4, \pi/4)} \operatorname{real}\left\{\sum_{l=0}^{L-1} (r(k+l) \cdot \exp(-j\theta_n))^4\right\} = \quad (3)$$

$$\operatorname*{argmin}_{\theta_n \in (-\pi/4, \pi/4)} \sum_{l=0}^{L-1} \operatorname{real}\{r^4(k+1) \cdot \exp(-j4\theta_n)\} =$$

$$\operatorname*{argmin}_{\theta_n \in (-\pi/4, \pi/4)} \sum_{l=0}^{L-1} |r(k+l)|^4 \cdot \cos(4 \cdot (\operatorname{angle}(r(k+1)) - \theta_n)),$$

and the result of this transformation of data to remove multipliers in block 318 may be output in block 620.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method for carrier phase recovery, comprising:
   receiving, using a receiver, one or more frames of L symbols;
   performing, using a phase estimator, carrier phase estimation for the one or more frames of L symbols and storing resulting carrier phase estimates in a non-transitory computer-readable storage medium;
   de-rotating, using a rotator, the one or more frames of L symbols by one or more of the resulting carrier phase estimates;
   calculating, using a data processor, a sum of the outputs of L de-rotated signals raised to an $n^{th}$ power, where n is an integer, and determining a real part of the sum;
   determining, using a minimum determination device, a minimum of the real part of the sum with respect to the carrier phase estimates, wherein phase unwrapping and multiplier removal are performed if the minimum of the real part has been determined.

2. The method of claim 1, wherein the resulting carrier phase estimates are stored in a Lookup Table (LUT).

3. The method of claim 1, wherein the method for carrier phase recovery employs a feed-forward structure, the feed-forward structure enabling parallel implementation of high-speed coherent receivers without performance degradation.

4. The method of claim 1, wherein the method for carrier phase recovery is modulation-independent.

5. The method of claim 1, wherein the phase unwrapping unwraps a current phase estimate based on a previous phase estimate.

6. The method of claim 1, wherein a frame length of the frame of L symbols is dependent on a magnitude of laser linewidth.

7. The method of claim 1, wherein the carrier phase estimates include a range from $-\pi/4$ to $\pi/4$.

8. The method of claim 7, wherein the method for carrier phase recovery recovers a signal carrier phase without prior knowledge of modulation formats.

9. A system for carrier phase recovery, comprising:
- a receiver for receiving one or more frames of L symbols;
- a phase estimator for performing carrier phase estimation for the one or more frames of L symbols, resulting carrier phase estimates being stored in a non-transitory computer-readable storage medium;
- one or more rotators for de-rotating the one or more frames of L symbols by one or more of the resulting carrier phase estimates;
- a data processor for calculating a sum of the outputs of L de-rotated signals raised to an $n^{th}$ power, where n is an integer, and for determining a real part of the sum;
- a minimum determination device for determining a minimum of the real part of the sum with respect to the resulting carrier phase estimates, wherein phase unwrapping and multiplier removal are performed if the minimum of the real part has been determined.

10. The system of claim 9, wherein the resulting carrier phase estimates are stored in a Lookup Table (LUT).

11. The system of claim 9, further comprising parallel implementation of high-speed coherent receivers without performance degradation.

12. The system of claim 9, wherein the system for carrier phase recovery is modulation-independent.

13. The system of claim 9, wherein the phase unwrapper unwraps a current phase estimate based on a previous phase estimate.

14. The system of claim 9, wherein a frame length of the frame of L symbols is dependent on a magnitude of laser linewidth.

15. The system of claim 9, wherein the carrier phase estimates include a range from $-\pi/4$ to $\pi/4$.

16. The system of claim 9, wherein the system for carrier phase recovery recovers a signal carrier phase without prior knowledge of modulation formats.

17. A non-transitory computer readable storage medium comprising a computer readable program, wherein the computer readable program when executed on a computer causes the computer to perform the steps of:
- receiving one or more frames of L symbols using a receiver;
- performing carrier phase estimation for the one or more frames of L symbols using a phase estimator, and storing resulting carrier phase estimates in a non-transitory computer-readable storage medium;
- de-rotating, using a rotator, the one or more frames of L symbols by one or more of the resulting carrier phase estimates;
- calculating, using a data processor, a sum of the outputs of L de-rotated signals raised to an $n^{th}$ power, where n is an integer, and determining a real part of the sum; and
- determining, using a minimum determination device, a minimum of the real part of the sum with respect to the resulting carrier phase estimates, wherein phase unwrapping and multiplier removal are performed if the minimum of the real part has been determined.

18. The computer readable storage medium of claim 17, wherein the phase unwrapping unwraps a current phase estimate based on a previous phase estimate.

19. The computer readable storage medium of claim 17, wherein a frame length of the frame of L symbols is dependent on a magnitude of laser linewidth.

20. The computer readable storage medium of claim 17, wherein the carrier phase estimates include a range from $-\pi/4$ to $\pi/4$.

* * * * *